(No Model.) 3 Sheets—Sheet 1.

J. D. SCHOFIELD.
PLANTER.

No. 545,824. Patented Sept. 3, 1895.

Witnesses
Edw. J. Duvall
W. J. S. Duvall

Inventor
James D. Schofield
by W. J. Duvall
Attorney (No Model.) 3 Sheets—Sheet 2.

J. D. SCHOFIELD.
PLANTER.

No. 545,824. Patented Sept. 3, 1895.

Witnesses
Edw. J. Duvall Jr.
W. J. S. Duvall

Inventor
James D. Schofield
by
J. J. Duvall
Attorney (No Model.) 3 Sheets—Sheet 3.

J. D. SCHOFIELD.
PLANTER.

No. 545,824. Patented Sept. 3, 1895.

Witnesses
Edw. D. Duvall Jr.
W. T. S. Duvall

Inventor
James D. Schofield
by H. S. Duvall
Attorney

UNITED STATES PATENT OFFICE.

JAMES DROMMOND SCHOFIELD, OF DALLAS, TEXAS.

PLANTER.

SPECIFICATION forming part of Letters Patent No. 545,824, dated September 3, 1895.

Application filed May 25, 1895. Serial No. 550,629. (No model.)

*To all whom it may concern:*

Be it known that I, JAMES DROMMOND SCHOFIELD, a citizen of the United States, residing at Dallas, in the county of Dallas and State of Texas, have invented certain new and useful Improvements in Planters; and I do hereby declare the following to be a full, clear, and exact description of the invention, such as will enable others skilled in the art to which it appertains to make and use the same.

My invention relates to improvements in seeders, and although more particularly intended for use in connection with corn and cotton planting machines, yet it is also applicable to machines in general that are employed for distributing seed and fertilizer.

The objects of my invention are to obviate the employment of covering-shovels heretofore necessary in seeders; to obviate the employment of the usual supporting-wheels; to accomplish the covering of the seed through covering-disks, through the medium of which and other intermediate devices motion is imparted to the agitating mechanism, and, finally, to provide for a convenient adjustment of these disks with relation to each other for the purpose of covering the seed to a greater or less depth.

I am aware that disk harrows, cultivators, &c., in which seeding mechanisms have been mounted, have had their seeding mechanisms operated by the shafts on which said disks were mounted; but this has only been possible on heavy machines, where gangs of disks were employed. My invention, however, resides in the construction before stated, whereby, as will be seen, I obviate, in a planter pure and simple, the employment of ground-wheels, supporting the entire mechanism upon the disks themselves, through which the seed is covered, and through which and other intermediary devices the agitating mechanism is operated.

Figure 1:
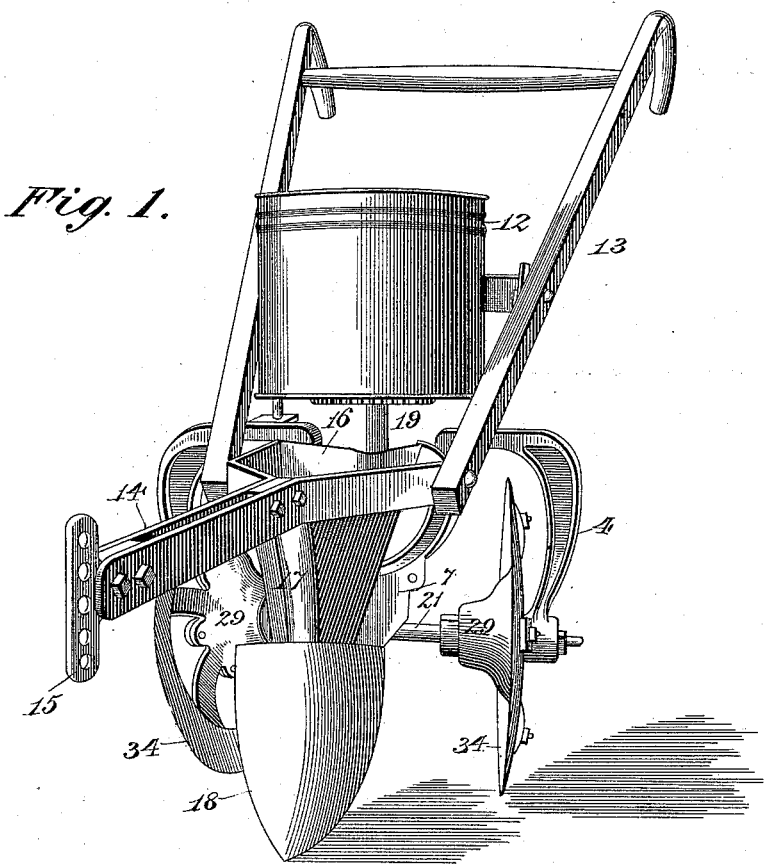
Figure 11:
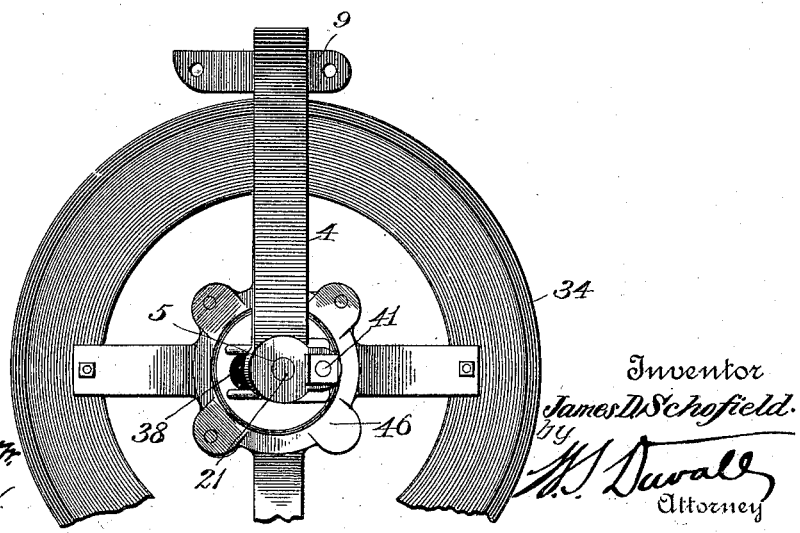
Figure 2:
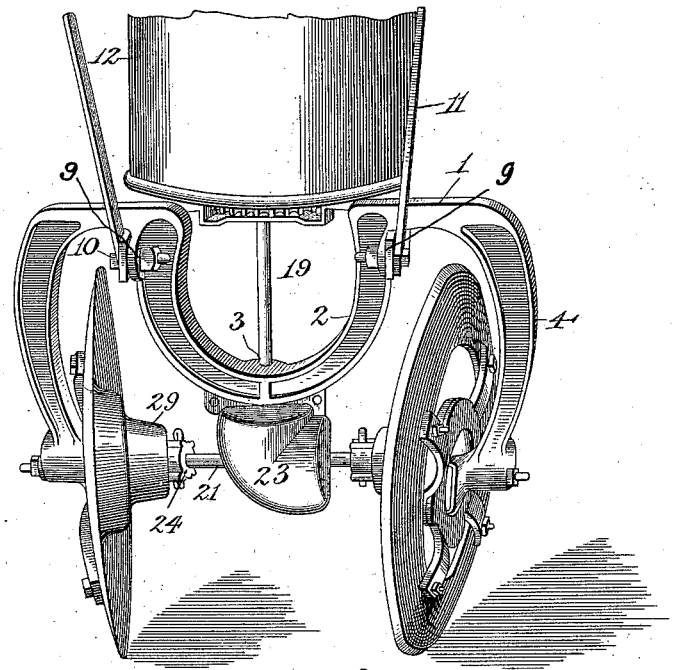
Figure 5:
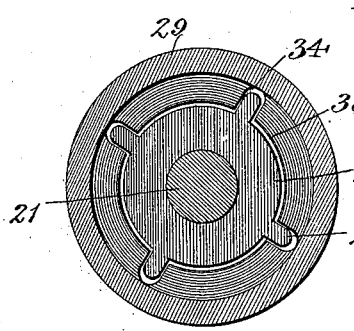
Figure 7:
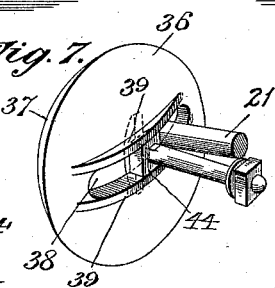
Figure 8:
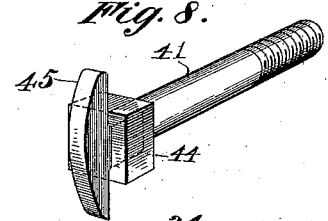
Figure 6:
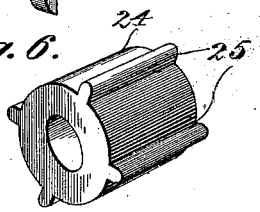
Figure 3:
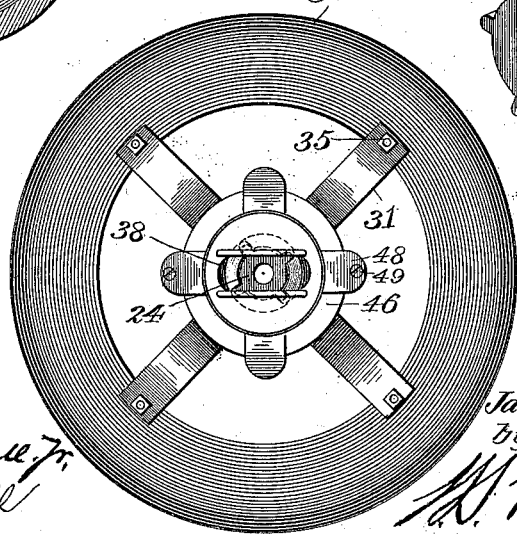
Figure 10:
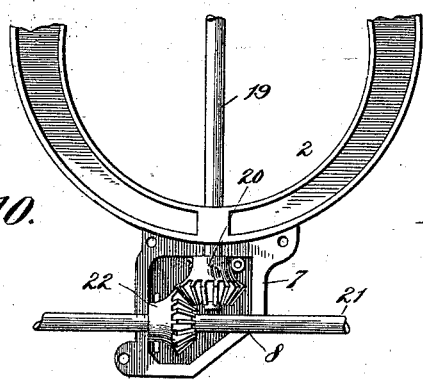
Figure 12:
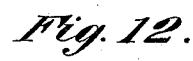
Figure 4:
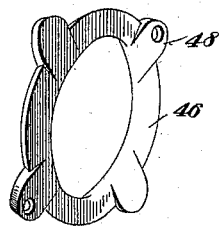
Figure 4:
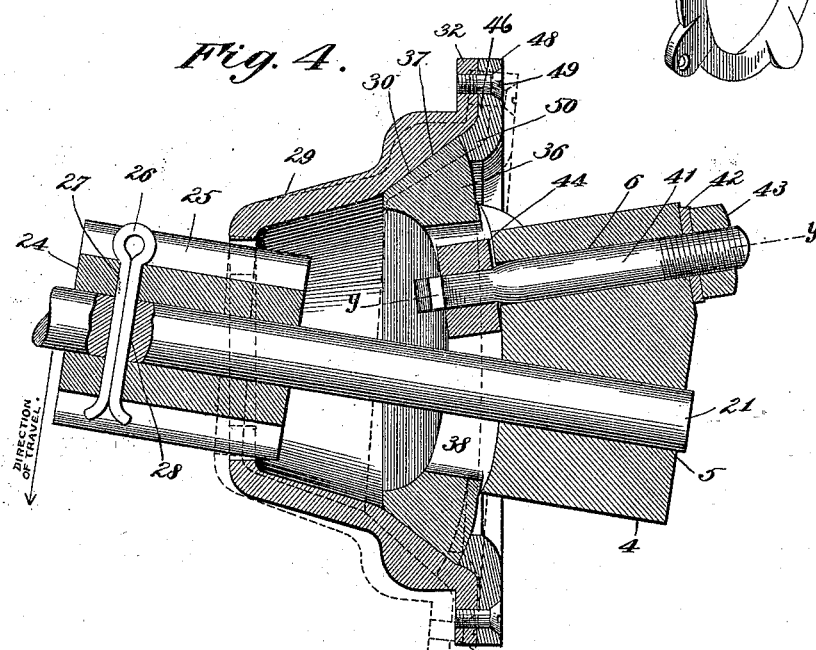
Figure 9:
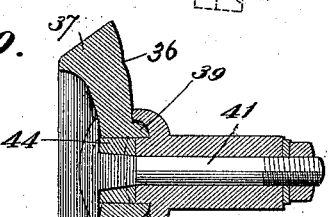

Referring to the drawings, Figure 1 is a perspective view of a planter or seeder embodying my invention. Fig. 2 is a similar view looking toward the rear, the upper portion of the machine being broken away. Fig. 3 is an elevation of one of the disks. Fig. 4 is a horizontal sectional view through one of the disk-hubs, illustrating its connection with the axle. Fig. 5 is a vertical transverse sectional view through the hub and axle. Fig. 6 is a detail in perspective of the axle-sleeve. Fig. 7 is a detail in perspective of the conical hub-disk. Fig. 8 is a detail in perspective of the bolt employed for holding the covering-disk in its adjusted position. Fig. 9 is a sectional view on the line $y\ y$ of Fig. 4. Fig. 10 is an elevation of the yoke portion of the supporting-frame and gearing. Fig. 11 is a view similar to Fig. 3, with the exception that the supporting-frame is shown in position. Fig. 12 is a detail in perspective of the hub-disk retaining-ring.

Like numerals of reference indicate like parts of construction in all the figures of the drawings.

In the practice of my invention I employ a casting which I will term the "planter-supporting frame" and will designate as 1. This casting comprises a central U-shaped yoke portion 2, in the center of which a vertical opening 3 is formed, and from its ends extend laterally and in opposite directions the depending arms or standards 4, in whose lower ends transverse aligning openings 5 are formed. At angles to the openings 5 and horizontally opposite the same bolt-openings 6 are formed. Depending from the center of the U-shaped yoke 2 of the supporting-frame is the gear-box 7, the same having in its upper side a hole aligning with the hole 3 in the frame 1 and at right angles thereto with transverse aligning holes 8, the latter not only aligning with each other, but also with the openings 5 in the depending standards 4. At the outer sides of the U-shaped yoke laterally-extending ears 9 are formed, the same being perforated for the accommodation of bolts 10, which latter not only pass through the ears, but also through braces 11, by means of which the hopper 12 is supported, and also the handles 13, which are located as usual. Those ears at the front side of the frame also have bolted thereto the lower ends of the handles 13, and likewise the divided beam 14, which extends to the front and embraces thereat the usual clevis 15. The rear divergent portion of the beam embraces the usual seed-spout 16, located under the hopper at its discharge-point and in advance thereof embraces and has bolted thereto the standard 17, at whose lower end the furrow-opening shovel 18 is located.

Within the hopper 12 may be located any known or hereafter devised construction of seed discharging and dropping mechanism. In the present instance the ordinary rotatable seed-disk, either for cotton, corn, or other grain, is employed and from the same depends the usual vertical driving-shaft 19, the lower end of which passes through the opening 3 in the supporting-frame casting and terminates in the gear-box 7. Within the gear-box the shaft 19 has secured thereto, preferably in a removable manner, a beveled gear or pinion 20.

21 designates the axle, and the same is journaled in the bearing-openings 5 and in the openings 8 of the gear-box. Within the latter there is located in a removable manner upon the axle the beveled gear or pinion 22, which intermeshes with the gear 20 of the drive-shaft 19, so that, as will be seen, motion from the axle will be imparted to the drive-shaft 19, and consequently the seed-disk. Of course it will be understood that in the event of a change of form in the agitating mechanism for discharging the seed it may be necessary to devise other means for conveying motion from the axle to such mechanism—as, for instance, a sprocket-wheel and chain or other well-known equivalent constructions may be substituted—all of which is fully comprehended by my invention.

In order to preserve the gearing from dust and from grass, weeds, &c., winding thereon and impairing its efficiency, the gear-box is covered by a removable elbow-shaped cover 23, suitable bolts being employed for the purpose of securing it in position.

Located upon the axle at each side of its center and near its ends are sleeves 24, the same having their cylindrical surfaces provided with a plurality of ribs 25, that are longitudinally disposed. The sleeves are held in position in a removable manner upon the axles and rigid therewith by means, in the present instance, of split keys 26, which are passed through perforations 27 and 28 produced in said sleeves and axle, respectively.

Over the outer end of each sleeve 24 is placed one end of a hollow truncated cone-shaped hub 29, the same being slightly more flaring at its outer end, producing an annular inclined bearing-surface 30 and beyond the same provided with a series of spoke-arms 31 and between the same with perforated ears 32. The rear or inner end of each hub is provided with a circular opening 33, which at intervals has its edge notched or recessed, as at 34, the latter agreeing in number and location with the ribs 25 on the sleeve 24. By this it will be seen that the hub will be interlocked with the sleeve and move with it and the axle. The opening 33 and notches 34 are slightly greater than the sleeves, so that the hubs are capable of lateral oscillation.

The outer ends of the series of spoke-arms 31 are perforated and applied to the outer faces of a pair of opposite disk-rims 34, to which they are secured by bolts 35, passed through the perforations and the rims.

36 designates the hub-disk, the same being circular and of concavo-convex form, there being such a disk for each of the hubs 29. This hub-disk closes the outer end of the hub, and around it revolves the hub. For this reason the disk is provided with a conical bearing edge or surface 37, which corresponds with the conical bearing-surface 30 of the hub. The disk 36 is provided with a horizontal, and therefore radial, slot 38, formed within its edge and which therefore does not extend entirely thereacross, and, furthermore, which aligns with the bearing-opening 5 of the ajacent depending standard 4 and with the inclined opening 6, likewise formed in said standard. The outer face of the disk, at the edges of its slot 38, is provided with a pair of parallel ribs 39, which are superficial, and which rest in corresponding grooves 40, with which the inner concaved faces of the standards 4 are provided at their lower ends, all as clearly shown.

Within the openings 6 bolts 41 are located, the same being at angles to the transverse axle 21. These bolts, as best shown in Figs. 4, 7, and 8, are provided at their outer ends with threads, and have mounted thereon, in a removable manner, washers 42 and binding-nuts 43. Those portions of the bolts which lie within the slots 38 are rectangular or square in cross-section and fit loosely within traveling nuts 44, which have corresponding openings for their reception and themselves fit loosely in the slots 38. The inner ends of the bolts 41, which lie beyond the traveling-nuts 44, have formed thereon T-shaped heads 45, whose abrupt shoulders engage the inner sides or surfaces of the hub-disks at each side of their slots 38. It will thus be seen that while the axle always remains transverse to the machine and at a right angle to its travel, yet by loosening the nuts 43 the disks, together with their hubs, may be oscillated or swung horizontally to assume a proper relative angle and, according to such angle, cover the seed deposited in the furrow to a greater or less depth. By a tightening of the nuts 43 the bolts 41 are drawn outward so that their T-heads bind the hub-disk snugly against the standards 4, so that their ribs 39, engaging with the grooves 40 in the standards, render said disks 36 immovable, while at the same time the hubs and covering-disks revolve after the fashion of ground-wheels, serving all the functions of the latter, such as operating the seeding mechanism, and, furthermore, serving the double function of covering devices for the seed.

It is necessary that some means be provided for retaining the hub-disks within the bearing portions of the hubs, and for this purpose I employ the retaining-rings 46, which are applied to the outer faces of the hubs, and which have formed at intervals along their outer edge perforated lugs or ears 48, which correspond to the lugs or ears 32 and are secured to the same by screws or bolts 49. The inner annular edge of this ring 46 extends inwardly, producing the inclined bearing-flange 50, which conforms to the bearing-surfaces 30 and 37 of the hub and hub-disk, respectively, and also to the outer face of the latter. It will thus be seen that by the combined efforts of the retaining-ring and the T-headed bolt the relative positions of the hub and hub-disk and axle are maintained.

From the foregoing description, in connection with the drawings, it will be apparent that I have produced a most useful, cheap, and simple improvement in that class of planters usually mounted upon supporting-wheels and employing independent covering devices, in that I have produced such covering devices as will serve the additional function of supporting-wheels, and which are capable of such relative adjustment as is necessary, and in the accomplishment of the same in no way disturb the positive driving of the agitating and seed distributing or discharging mechanisms.

I do not limit my invention to the precise details of construction herein specified; but hold that I may vary the same as to such details without departing from the spirit of my invention or sacrificing any of its inherent advantages.

Having described my invention, what I claim is—

1. The combination with a main-frame, of a transverse axle journaled therein, of disks arranged on the axle and adapted to move therewith, and means for adjusting said disks at an angle to each other and to the axle and independent of said axle, substantially as specified.

2. The combination with the main-frame of a planter, a transverse axle journaled therein, means for conveying motion from the axle to the agitating mechanism of the planter, of furrow-covering disks arranged on the axle and adapted to move therewith, and means for adjusting said disks at an angle to each other and to the axle, substantially as specified.

3. The combination with the U-shaped main-frame of a planter, of hub-supporting disks secured for lateral adjustment to the ends of the frame, disks having hubs rotatably mounted on the hub-supporting disks, and means for conveying motion from said disks to the seed-dropping mechanism, substantially as specified.

4. The combination with the main-frame of a planter, an axle journaled therein and means for conveying motion from the axle to the agitating-mechanism, of a pair of opposite combined planter-supporting and furrow-covering disks mounted upon the axle so as to move therewith and means for adjusting them laterally at an angle to the axle, substantially as specified.

5. The combination with the main frame of a planter, the same comprising a pair of depending bearing-standards, an axle journaled for rotation therein, a pair of hub-disks arranged on the axle slotted to receive the axle, and means for adjusting them at angles to the axle and upon the standards, of a pair of hollow hubs adapted for rotation and mounted upon and loosely connected with the hub-disks and positively and movably connected with the axle, covering and supporting-disks arranged on the hubs so as to move therewith, and means for conveying motion from the axle to the agitating-mechanism substantially as specified.

6. The combination with the main frame of a planter, the same consisting of the central U-shaped portion 2 and the outwardly disposed and depending standards 4 having the bearings 5, the angularly disposed openings 6, concaved faces and grooves 40, of the transverse axle 21 arranged in the bearings 5, the seed driving-shaft 19 journaled vertically in an opening 3 formed in the yoke-portion 2, the intermeshing gears 20 and 22 arranged on the shaft and axle respectively, the gear-box 7 covering the same and depending from the yoke-portion and having the removable cover 23, the sleeves 24 having the ribs 25, pins 26 passing through the sleeves and axle, the hollow conical hubs 29 having at their inner ends the openings 33 for receiving the sleeves and the notches 34 for receiving the ribs thereof, and having at their outer sides the inclined bearing-surfaces 30, radial spoke-arms 31 and perforated ears 32, the disk-rims 34 bolted to the arms, the conical hub-disks 36 having the external inclined bearings 37 and the radial slots 38 provided at their edges with the superficial ribs 39 engaging the grooves 40 of the standards, the retaining-rings 46 having the inwardly disposed bearing-flanges 50, and perforated ears 48, the screws 49 connecting the same with the ears 32, the bolts 41 arranged in the openings 6 and having the squared-portions within the slots 38 and beyond the same having the T-heads 45 engaging the edges of the slots, the nuts 43 on the outer ends of the bolts and the interposed washers 42, substantially as specified.

7. The combination with the main-frame of a planter, having depending standards and opposite aligning bearings, of a transverse rotatable axle, ribs arranged around the same, loose hubs engaging the ribs, disks supported loosely upon the axle and having their hub-portions loosely engaging the ribs, means for adjusting the disks at angles to themselves and axle, and means for conveying motion from the axle to the agitating-mechanism, substantially as specified.

8. The combination with a planter-frame comprising depending standards having bearings, an axle arranged loosely in the bearings and means for conveying motion from the same to the agitating-mechanism of the planter, of sleeves mounted rigidly on the axle and provided with ribs, hubs loosely engaging the ribs and capable of oscillation, means for adjusting the hubs at angles to the sleeves and disks carried by the hubs, substantially as specified.

9. The combination with the main-frame of a planter having depending standards provided with openings, an axle journaled in the openings, means for conveying motion from the axle to the agitating-mechanism, and ribbed-sleeves arranged on the axle, of hollow conical hubs loosely engaging the sleeves and ribs and provided at their outer sides with annular bearing-surfaces, disks carried by the hubs, slotted hub-disks arranged at the outer faces of the hubs and slidably mounted at the inner sides of the standards, means for adjusting the hub-disks at angles to the axle and for retaining them within the hubs, substantially as specified.

10. The combination with the main-frame of a planter, having depending standards provided with openings, an axle journaled in the openings, means for conveying motion from the axle to the agitating-mechanism, and ribbed-sleeves arranged on the axle, of hollow conical hubs loosely engaging the sleeves and ribs and provided at their outer sides with annular bearing-surfaces, disks carried by the hubs, slotted hub-disks arranged in the hubs and having surfaces for their bearings, bolts passed through the standards and slots of the hub-disks, nuts for the ends of the bolts, heads at the inner ends of the bolts and means for loosely and slidably connecting the bolts to the slots of the hub-disks, substantially as specified.

In testimony whereof I affix my signature in presence of two witnesses.

JAMES DROMMOND SCHOFIELD.

Witnesses:
A. V. LANE,
GEO. W. ROGERS.